(No Model.)
G. F. SHAVER.
TELEPHONE.
No. 479,226. Patented July 19, 1892.
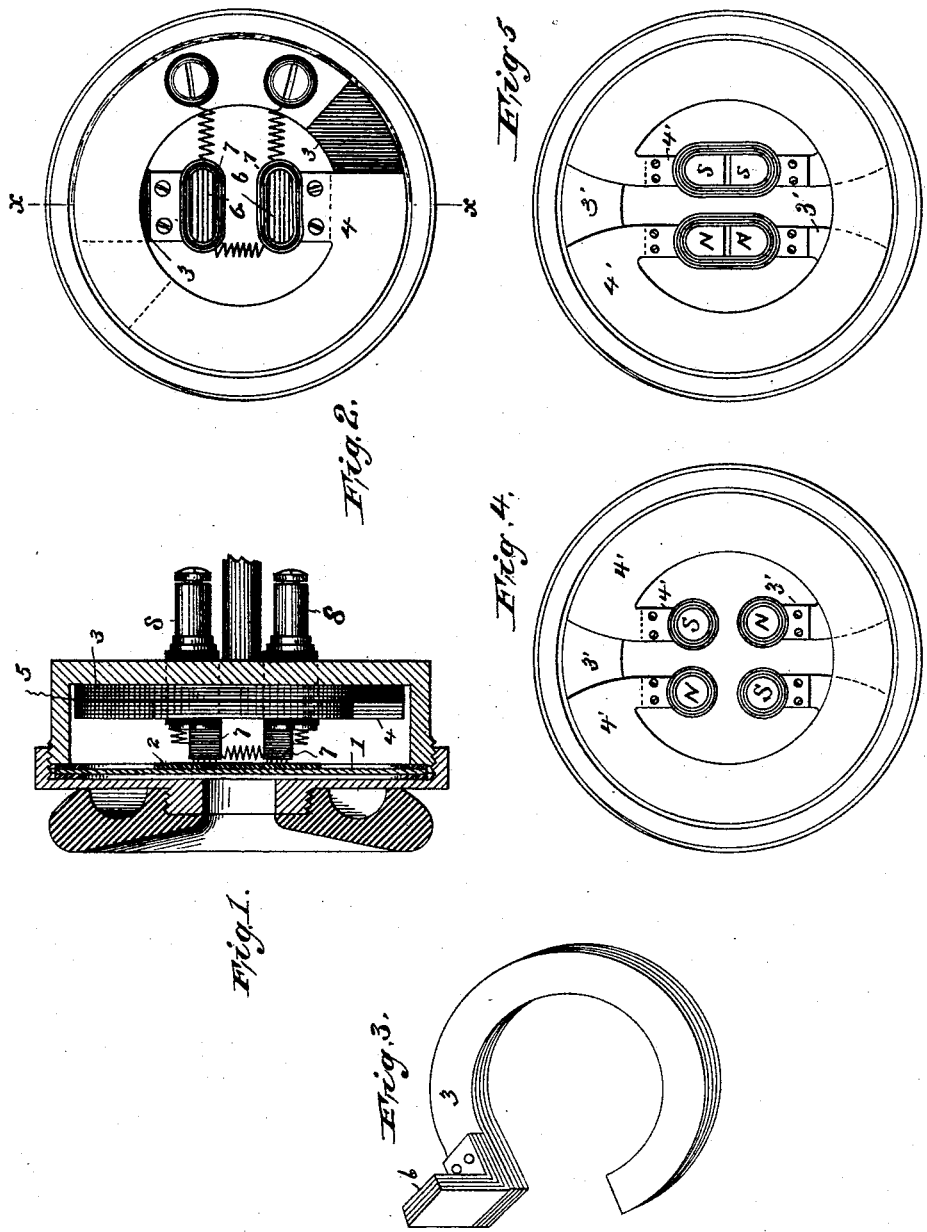
Attest;
C. H. Benjamin
Willard P. Shaw
Inventor;
George F. Shaver
by Thomas Ewing Jr.
Attorney.

UNITED STATES PATENT OFFICE.

GEORGE F. SHAVER, OF YONKERS, NEW YORK, ASSIGNOR OF ONE-HALF TO STEPHEN F. SHERMAN, OF NEW YORK, N. Y.

TELEPHONE.

SPECIFICATION forming part of Letters Patent No. 479,226, dated July 19, 1892.

Application filed March 2, 1892. Serial No. 423,511. (No model.)

*To all whom it may concern:*

Be it known that I, GEORGE F. SHAVER, a citizen of the United States of America, residing at Yonkers, Westchester county, and State of New York, have invented certain new and useful Improvements in Telephones, of which the following is a specification.

My invention is an improvement in telephones; and it consists in a peculiar arrangement and construction of the magnets of the receiver and in certain other details hereinafter described and claimed.

Referring to the accompanying drawings, Figure 1 is a cross-section of the receiver, partly in elevation, on the line x x of Fig. 2. Fig. 2 is a plan view with the front of the casing and the diaphragm removed. Fig. 3 is a detail view, in elevation, of one of the magnets. Figs. 4 and 5 are plans similar to Fig. 2, showing different shapes of the magnets and different arrangement of their poles.

The diaphragm of the receiver may consist of a disk of aluminium 1, at the center of which is attached by solder or otherwise a disk of soft iron 2, which lies directly in front of the poles of the magnet.

The other parts of the receiver, as shown, are as follows: One or more, preferably two, permanent laminated magnets or magnetic batteries 3 4 are bent into the form of incomplete rings, and are laid one on top of the other with a ring of copper or other magnetically-insulating material 5 between them. The magnets are reversed, so that their neutral lines lie on opposite sides of the circle. The pole-pieces 6 of these magnets extend into the ring, so as to be immediately under the soft-iron disk of the diaphragm. They are of soft iron, are laminated, and attached to the permanent ring-shaped magnets by rivets or otherwise. Around them are wound coils 7, connected with binding-posts 8, attached to the frame of the receiver and connected to the line-wires.

In the forms shown in Figs. 1, 2, and 3 each permanent magnet has attached to it only one soft-iron pole-piece. These pole-pieces are attached to opposite ends or poles of the permanent magnets. They extend into the ring and are bent at right angles, so that their faces shall lie parallel with and close to the soft-iron disk of the diaphragm.

In the modified form shown in Fig. 4 the two ring-magnets have each two pole-pieces of soft iron attached to the ends thereof and set with opposite poles facing each other, as will be seen by the letters N S, which indicate north and south poles. With this arrangement four coils are necessary.

Fig. 5 shows a modification of the arrangement of the magnets shown in Fig. 4, like poles of the two magnets being placed together. With this arrangement of the poles of the magnets only two coils are needed.

Without limiting myself to the precise details shown, what I claim, and desire to secure by Letters Patent of the United States, is—

In a telephone-receiver, the combination of one or more magnets, each forming an incomplete ring and having pole-pieces extending into the ring, the magnets being reversed and laid one upon the other with a diaphragm adjacent to the pole-pieces, substantially as described.

Subscribed by me, in New York city, this 29th day of February, 1892.

GEORGE F. SHAVER.

In presence of—
 WM. COPPORD,
 THOMAS EWING, Jr.